United States Patent
Hasegawa

[11] Patent Number: 6,116,346
[45] Date of Patent: Sep. 12, 2000

[54] HORSESHOE

[76] Inventor: Kazuhiro Hasegawa, c/o Taiwa Co., Ltd. 811, Ichihiraga, Seki-shi, Gifu-ken 501-3822, Japan

[21] Appl. No.: 09/028,202

[22] Filed: Feb. 23, 1998

[30] Foreign Application Priority Data

Feb. 18, 1998 [JP] Japan ................... 10-036445

[51] Int. Cl.$^7$ ........................................ A01L 1/04
[52] U.S. Cl. .................................................. 168/23
[58] Field of Search .................... 168/4, 13, 23, 168/DIG. 1

[56] References Cited

U.S. PATENT DOCUMENTS

| | | | |
|---|---|---|---|
| 674,655 | 5/1901 | Patrick | 168/14 |
| 785,577 | 3/1905 | Sandfield | 168/4 |
| 876,265 | 1/1908 | Campbell | 168/4 |
| 1,130,834 | 3/1915 | Nolan | 168/4 |
| 2,705,536 | 4/1955 | Phreaner | 168/4 |
| 3,200,885 | 8/1965 | Johnson | 168/12 |
| 3,288,223 | 11/1966 | Ferguson | 168/12 |
| 3,425,493 | 2/1969 | Kulak | 168/4 |
| 3,907,036 | 9/1975 | Capone | 168/26 |
| 3,970,149 | 7/1976 | Featherstone | 168/25 |
| 4,122,900 | 10/1978 | Barr et al. | 168/12 |
| 4,189,004 | 2/1980 | Glass | 168/4 |
| 4,286,666 | 9/1981 | Nakanishi | 168/4 |
| 4,299,288 | 11/1981 | Peacock | 168/23 |
| 4,513,824 | 4/1985 | Ford | 168/4 |
| 4,585,068 | 4/1986 | Jungersen | 168/11 |
| 4,645,008 | 2/1987 | Benning | 168/11 |
| 4,691,782 | 9/1987 | Stine | 168/12 |
| 4,760,885 | 8/1988 | Benning | 168/11 |
| 4,878,541 | 11/1989 | Pedersen | 168/4 |
| 4,889,188 | 12/1989 | Anderson | 168/13 |
| 4,892,150 | 1/1990 | Thoman | 168/4 |
| 5,048,614 | 9/1991 | Klimklo | 168/29 |
| 5,137,092 | 8/1992 | Tuunanen | 168/4 |
| 5,172,766 | 12/1992 | Adkins | 168/14 |
| 5,205,362 | 4/1993 | Noffsinger | 168/13 |
| 5,213,163 | 5/1993 | Schaffer | 168/4 |
| 5,320,184 | 6/1994 | Noffsinger | 168/13 |
| 5,330,008 | 7/1994 | Sigafoos | 168/12 |
| 5,343,957 | 9/1994 | Chapman | 168/11 |
| 5,353,878 | 10/1994 | Lee | 168/13 |
| 5,638,905 | 6/1997 | Singafoos | 168/17 |
| 5,699,861 | 12/1997 | Singafoos | 168/17 |

FOREIGN PATENT DOCUMENTS

| | | | |
|---|---|---|---|
| 0 445 056 | 3/1991 | European Pat. Off. . | |
| 363883 | 3/1906 | France . | |
| 684583 | 4/1931 | France | 168/4 |
| 3423838 | 6/1984 | Germany . | |
| 44 04 160 A1 | 6/1994 | Germany . | |
| 295 17 357 U1 | 2/1996 | Germany . | |
| 296 07 441 U1 | 8/1996 | Germany . | |
| 296 13 616 U1 | 10/1996 | Germany . | |
| 416775 | 12/1946 | Italy | 168/4 |
| 08214751 | 8/1996 | Japan . | |
| 4326 | 10/1880 | United Kingdom | 168/4 |
| 383574 | 11/1932 | United Kingdom | 168/13 |
| 2012542 | 8/1979 | United Kingdom . | |
| 2120072 | 11/1983 | United Kingdom . | |
| WO 88/00793 | 2/1988 | WIPO . | |
| WO 94/22296 | 10/1994 | WIPO . | |
| WO 96/01044 | 1/1996 | WIPO . | |

*Primary Examiner*—Robert P. Swiatek
*Assistant Examiner*—Son T. Nguyen
*Attorney, Agent, or Firm*—Fish & Richardson P.C.

[57] ABSTRACT

A horseshoe has indexing recesses or marks that specify locations where a nails are to be driven so that the horseshoe is mounted to hoof. The indexing recesses or marks are arranged consecutive in a widthwise direction in the lower surface of the horseshoe.

4 Claims, 8 Drawing Sheets

HORSESHOE

BACKGROUND OF THE INVENTION

1. Field of the Invention

The present invention relates to a horseshoe.

2. Description of the Related Art

Conventional horseshoe has a shoe body with a hoof shape formed by forging with steel. Recently, various horseshoes designed to reduce their weights have been proposed as replacements of the steel horseshoes. FIG. 9 is perspective view of the horseshoe with its bottom side. The horseshoe has a shoe body 31 including a core 32 of aluminum. The core 32 has a shape matching with a hoof, and a coating layer 33 of a synthetic resin enclosing the entire outer surface of the core 32. A plurality of grooves 35 radially extend in the bottom surface that contacts the surface of a road.

The shoe body 31 is mounted on the horse's hoof with square nails 23 driven into the hoof from the bottom surfaces of the grooves 35. This manual work needs a long experience and a skill of the operator, since each nail 23 should be driven in an accurate position in the groove 35. At the time of replacing a horseshoe, particularly, the nails must be driven in the same positions in the new shoe as the previous ones in the old shoe to thereby drive the nails in the positions of the hoof. Accordingly, this work can be carried out by selected skillful worker.

There is another conventional horseshoe having recesses in the bottom surface of the shoe body. This horseshoe has the recesses arranged near and along the periphery of the shoe body to designate the positions where the nails are to be driven. In this horseshoe, the nails can be driven in the accurate positions. However, the positions for driving the nails are restricted to the peripheral area in this horseshoe. The positions can not be changed in a widthwise direction of the horseshoe.

SUMMARY OF THE INVENTION

It is a major objective of the present invention to provide a horseshoe that can optimally protects a horse's hoof.

It is another objective of the present invention to provide a horseshoe that can be accurately mounted on the hoof.

To achieve the above objectives, an improved horseshoe is provided. The horseshoe has an upper surface that contacts the hoof and a lower surface that contacts a surface of a road, wherein the lower surface has indexing means for specifying locations where the nails are to be driven. The indexing means is arranged consecutive in a widthwise direction in the lower surface of the horseshoe.

DETAILED DESCRIPTION OF THE PREFERRED EMBODIMENTS

Figure 1:
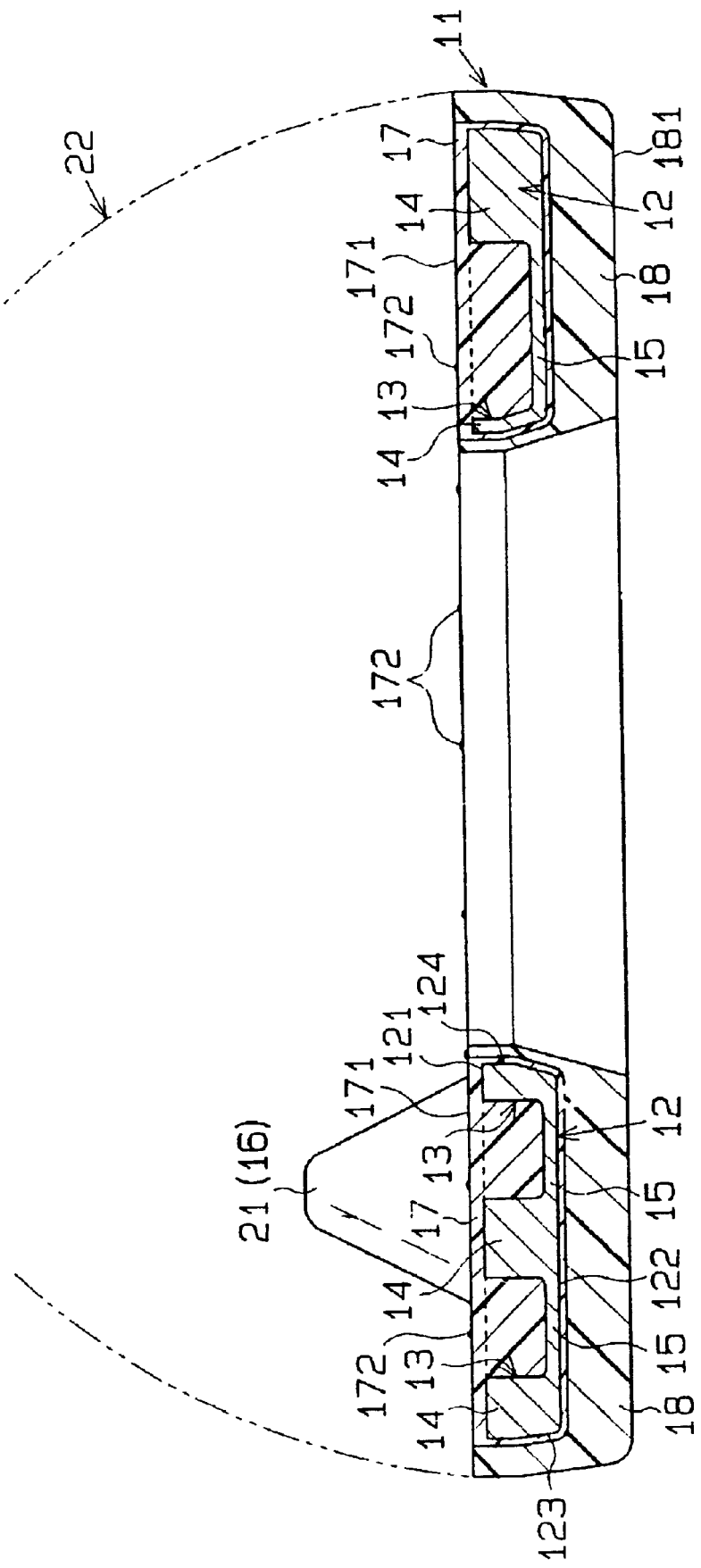
FIG. 1 is cross-sectional view illustrating a horseshoe according to the present invention.
Figure 2:
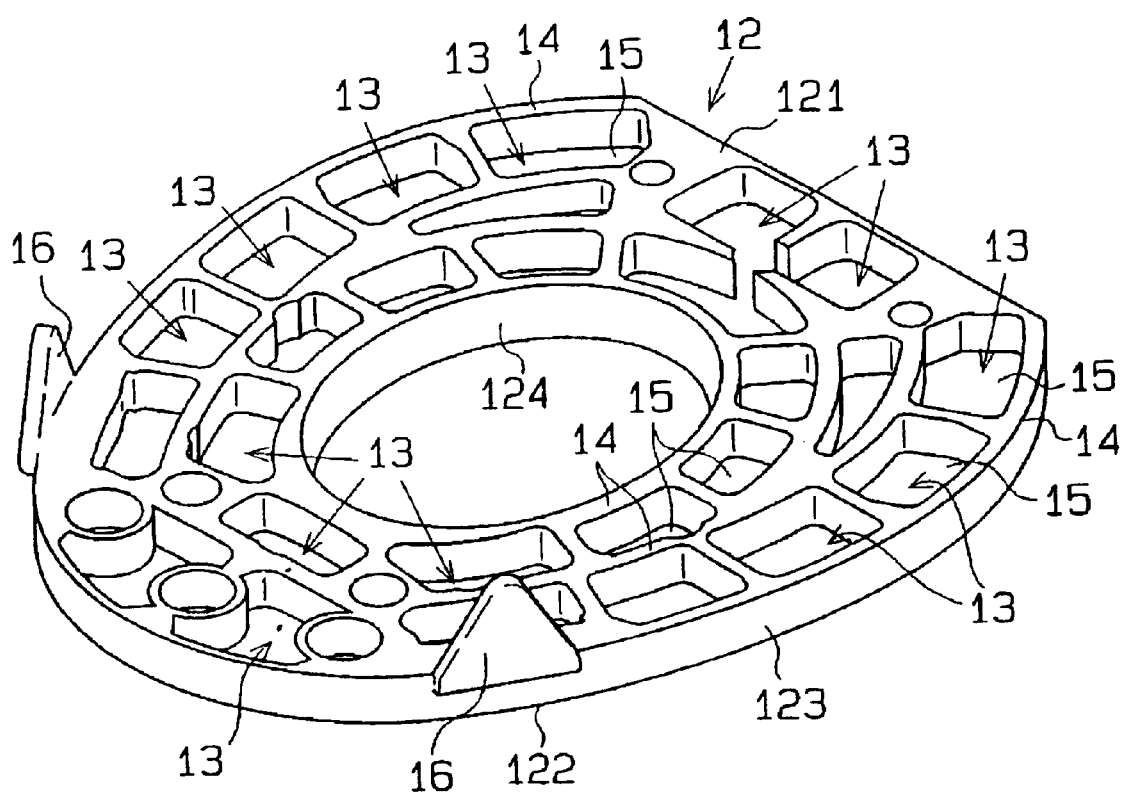
FIG. 2 is a perspective view illustrating a core forming a shoe body.

A horseshoe according to a preferred embodiment of the present invention will now be described with reference to FIGS. 1 through 6.

A shoe body 11 has a core 12 forged with steel into a ring shape corresponding to a hoof shape. The core 12 has its top surface 121 and its bottom surface 122. Recesses 13 are marked off and formed on the top surface 121. The formation of the recess 13 provides thick portions 14 and thin portions 15.

Figure 3:
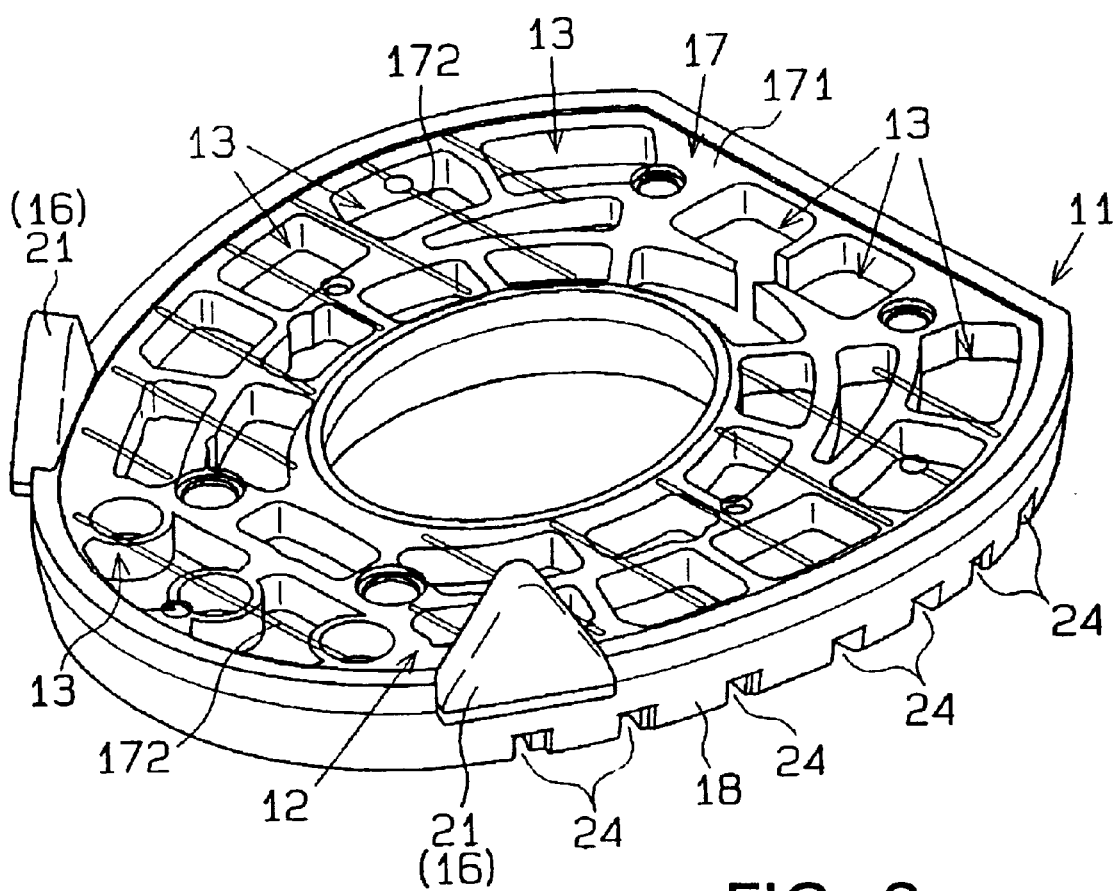
FIG. 3 is a perspective view illustrating the horseshoe.

Iron lips 16 are securely provided by forging, standing upright, on the periphery of the core 12 at two locations to restrict the forward movement of a hoof 22 on the top of the shoe body 11. As shown in FIG. 1, the top surface 121, bottom surface 122, and outer and inner peripheral surfaces 123, 124 of the core are mold-coated with a first coating layer 17 of a transparent resin. A top surface 171 of this first coating layer 17 contacts the hoof 22. Projections 172 are formed on the top surface 171 of the layer 17 as shown in FIGS. 1, 3. Each of the projections functions to prevent the hoof 22 from sliding on the layer 17. The material for the layer 17 may be an urethane-based resin (polyurethane).

The bottom surface 122, and the outer peripheral surface 123 and the inner peripheral surface 124 are mold-coated with the first coating layer 17. They are mold-coated with a second coating layer 18 comprised of a transparent resin material. A bottom surface 181 of this second coating layer 18 contacts the surface of road. The resin for the second coating layer 18 is a reinforced, wear resisting material, such as copolymer (Teflon FEP) of carbon, tetrafluoroethylene and hexafluoropropylene resins, or a tetrafluoethylene resin mixed in the aforementioned urethane-based resin.

Figure 4:
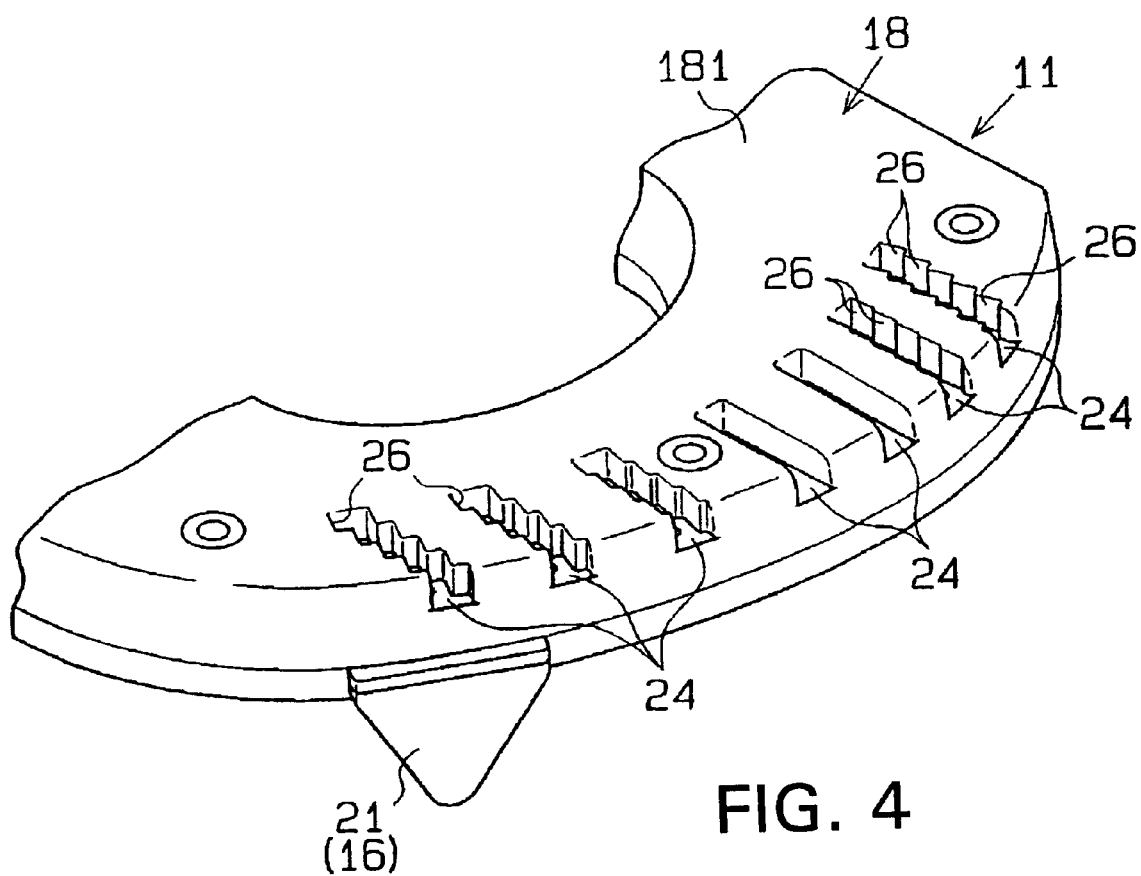
FIG. 4 is a fragmentary perspective view illustrating a top surface of the horseshoe.
Figure 5:
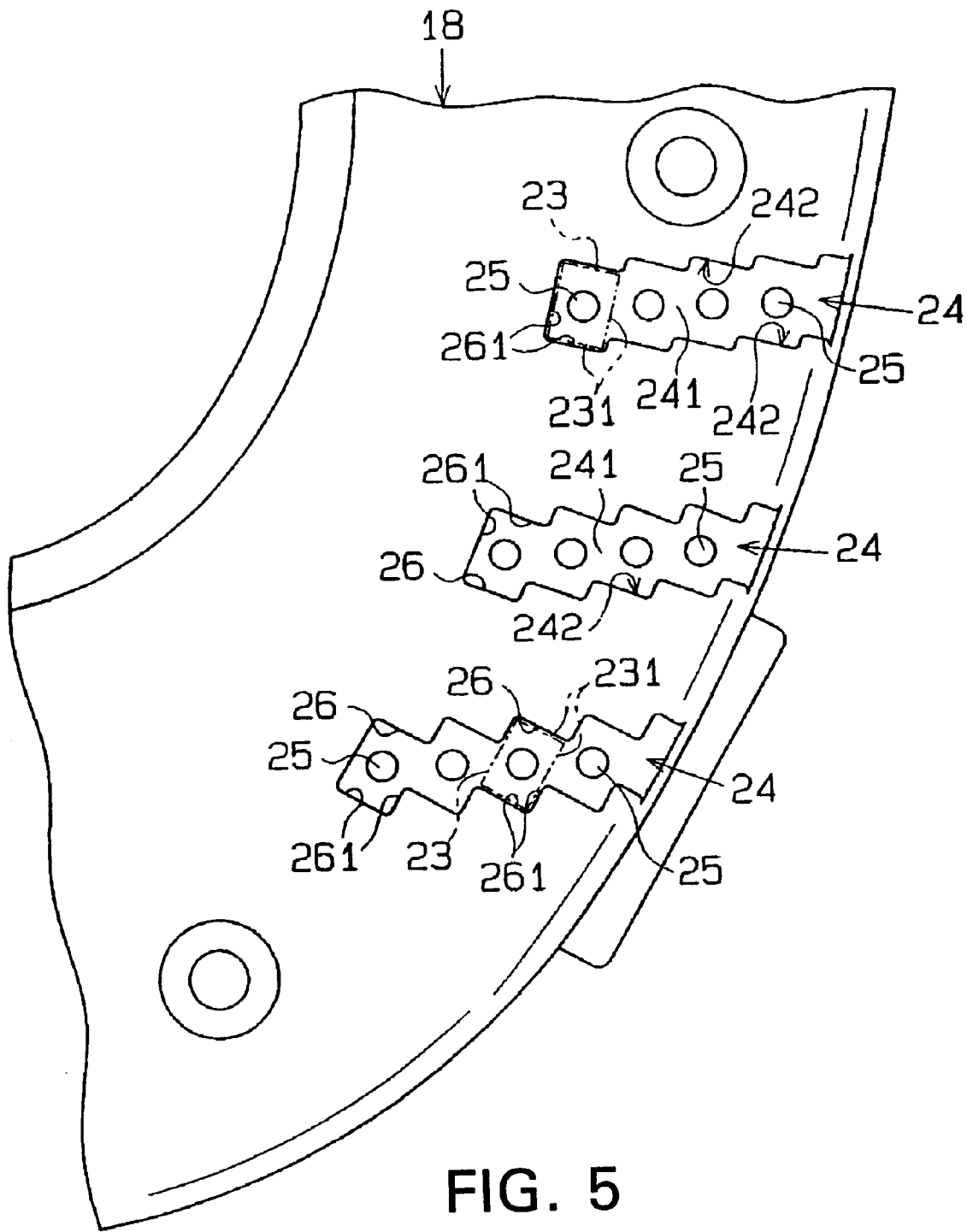
FIG. 5 is a fragmentary bottom plain view illustrating the horseshoe.
Figure 6:
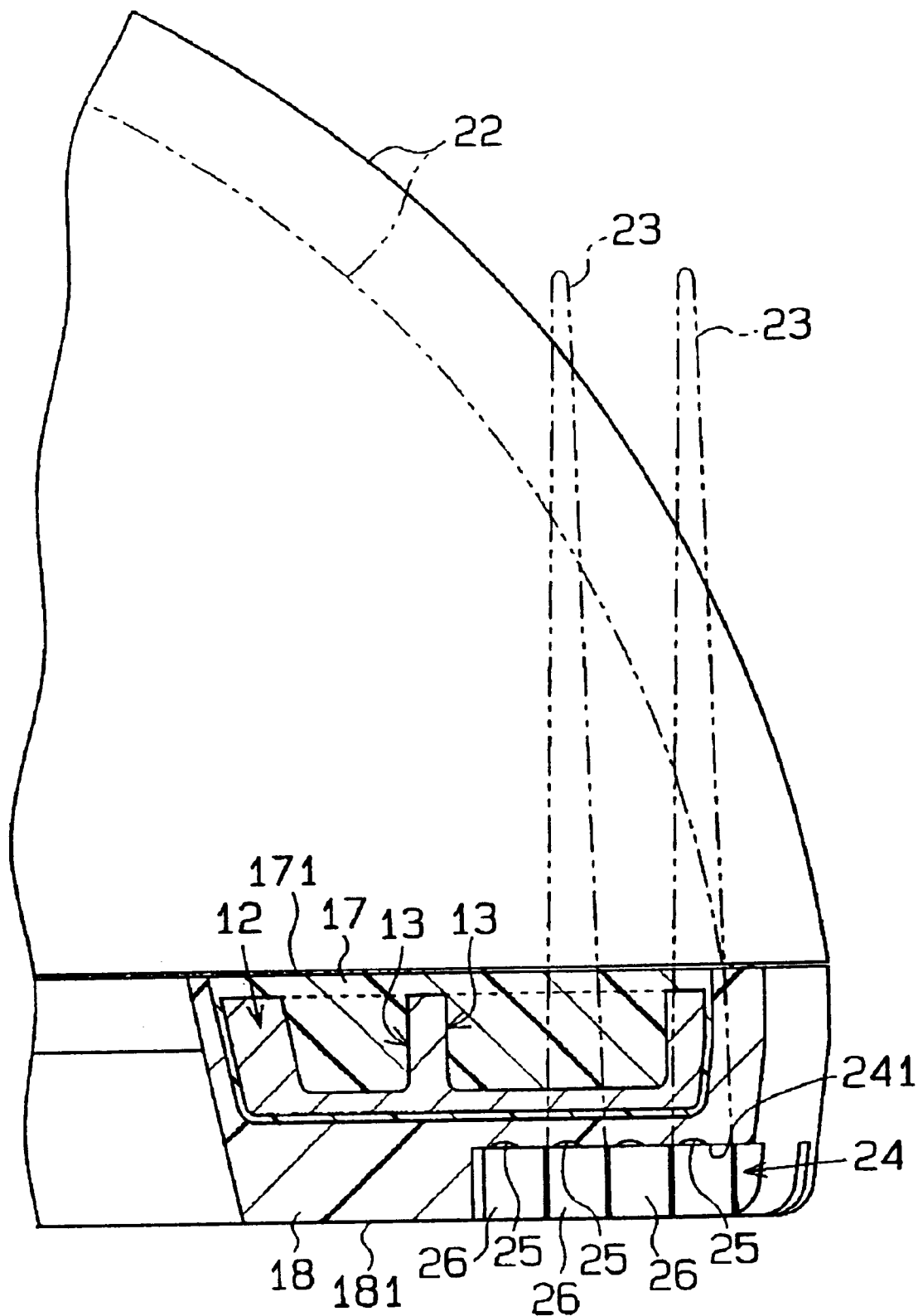
FIG. 6 is an enlarged cross-sectional view illustrating the essential portions of the horseshoe.

As illustrated in FIG. 4, grooves 24 are formed in the bottom surface 181 of the layer 18 at a plurality of locations. The grooves 24 extend in parallel to each other. Each of the grooves 24 opens to the outer periphery of the shoe body 11. As shown in FIG. 5, a plurality of (four to six in this embodiment) recesses 25 are formed linearly at predetermined pitches in a bottom 241 of the groove 24. The recesses 25 function as a group of indexes to indicate a point where the square nails 23 are to be driven.

As shown in FIG. 4, the from three and the rear two of the grooves 24 each has guide notches 26 arranged at a plurality of locations along opposing walls 242. Each of the guide notches 26 specifies the position and the angle at which the associated square nail 23 is to be driven so as to guide the square nail 23 that is driven in the horseshoe. Each of the notches 26 has a guide surface 261 for guiding a side 231 of the associated square nail 23. The square nail 23 is, thus, kept parallel to the outer surface of the shoe body 11 as illustrated in FIG. 5.

Mold formation of the coating layers 17, 18 is carried out as follows.

After the core 12 has been laid in the cavity of one of the molds, a resin solution is injected into the cavity to entirely enclose the core 12 to form the first coating layer 17. The resin solution is also injected into each recess 13, thereby mold-forming the first coating layer 17. Subsequently, a resin solution is injected into the cavity to enclose the surface of the first coating layer 17 other than the top surface thereof, while the core 12 enclosed with the first coating layer 17 is retained in the cavity of another mold. The second coating layer 18 is thus formed. At the time the first coating layer 17 is formed, a coating layer 21 which covers the outer surfaces of the iron lips 16 is formed.

In consideration of the relative sizes of the shoe body 11 and the hoof 22, it is determined which recess in the groove 24 the square nail 23 should be driven to attach the shoe body 11 to the hoof 22.

Nail driving holes are previously bored through the first and second coating layers 17, 18 with a drill at the positions of the specific indication recesses 25 where the associated nails are to be driven.

Subsequently, a horse's leg is bent to keep the hoof 22 obliquely upward, so that the top surface 171 of the first coating layer 17 of the shoe body 11 abuts against the bottom surface of the hoof 22. Next, the square nail 23 is driven into the hoof 22 through the hole formed in association with the corresponding recess 25 of the groove 24. Then, the distal end of the square nail 23 which protrudes from the hoof 22 is bent along the surface of the hoof 22. The above work is carried out for every nail position to complete attachment of the horseshoe to the hoof 22.

As the shoe body 11 has the multiple recesses 13 formed in the top surface 121 of the steel forged core 12, it can have a lighter weight and an improved durability while keeping the rigidity, as compared with the one having the core 12 integrally formed of a steel-based material.

The formation of indication recesses 25 is carried out in light of the size of the horseshoe that matches with the size of horseshoe. Accordingly, the recesses 25 accurately specify the positions where the nails are to be driven in accordance with the size of the hoof 22.

The guide notches 26 functions as auxiliary indexes specifying the positions where the nails are to be driven. Furthermore, each guide surface 261 defining the notch 26 contacts the side 231 to keep the nail untilted, resulting in the optimal driving of the nail 23 in the hoof.

As the grooves 24 are formed in parallel to one another in the widthwise direction of the shoe body 11, the guide notches 26 can surely be formed in the front and rear grooves 24 as shown in FIGS. 4 and 5.

It should be apparent to those skilled in the art that this invention may be embodied in the following forms.

Figure 7:
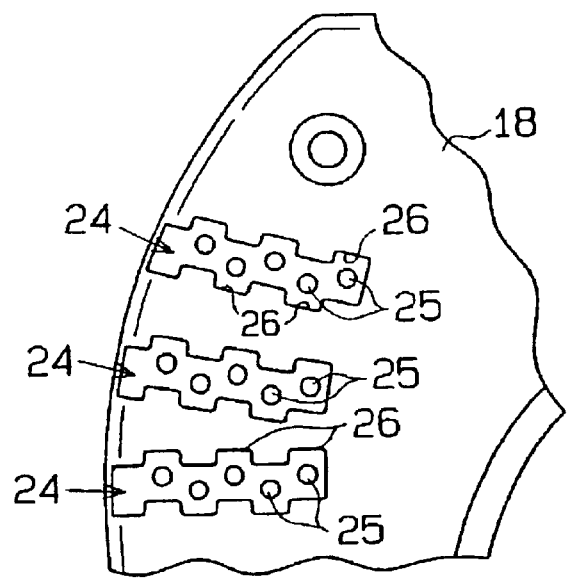
FIG. 7 is a partly bottom plan view a modification of the horseshoe.

As illustrated in FIG. 7, the guide notches 26 may be formed in a zigzag form relative to the grooves 24. In this case, the guide notches 26 can be formed in all the grooves 24 even when the grooves extend radially.

Figure 8:
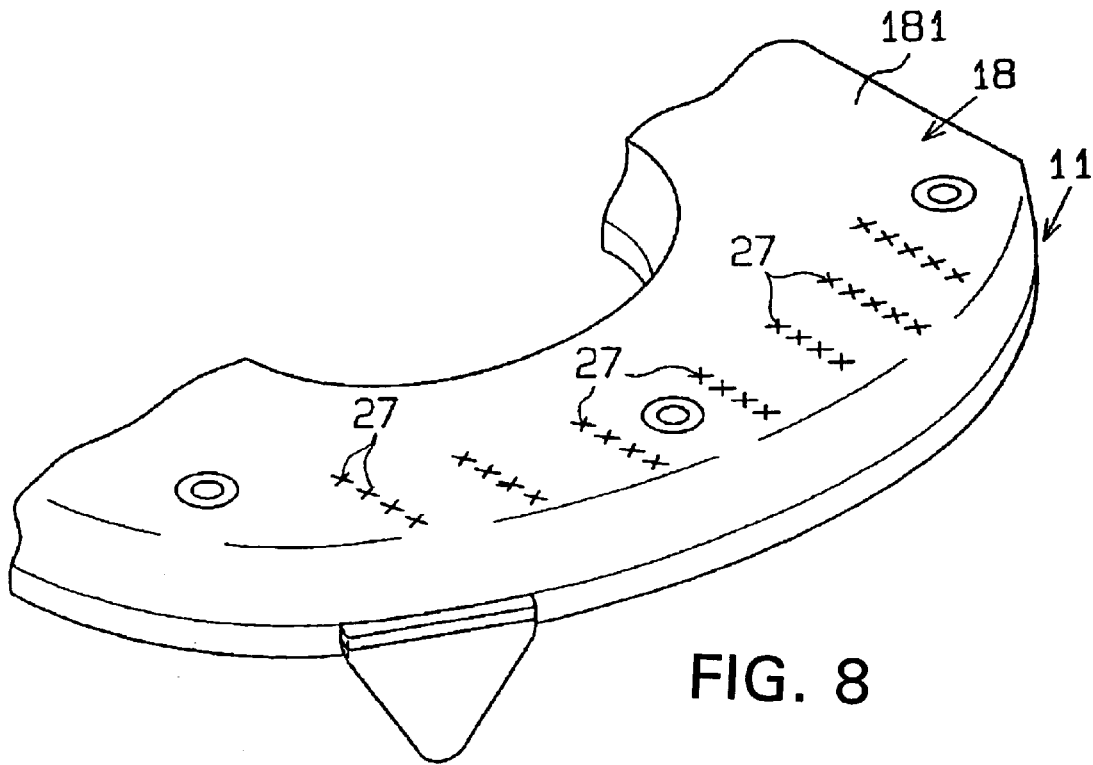
FIG. 8 is a perspective view illustrating another modification.
Figure 9:
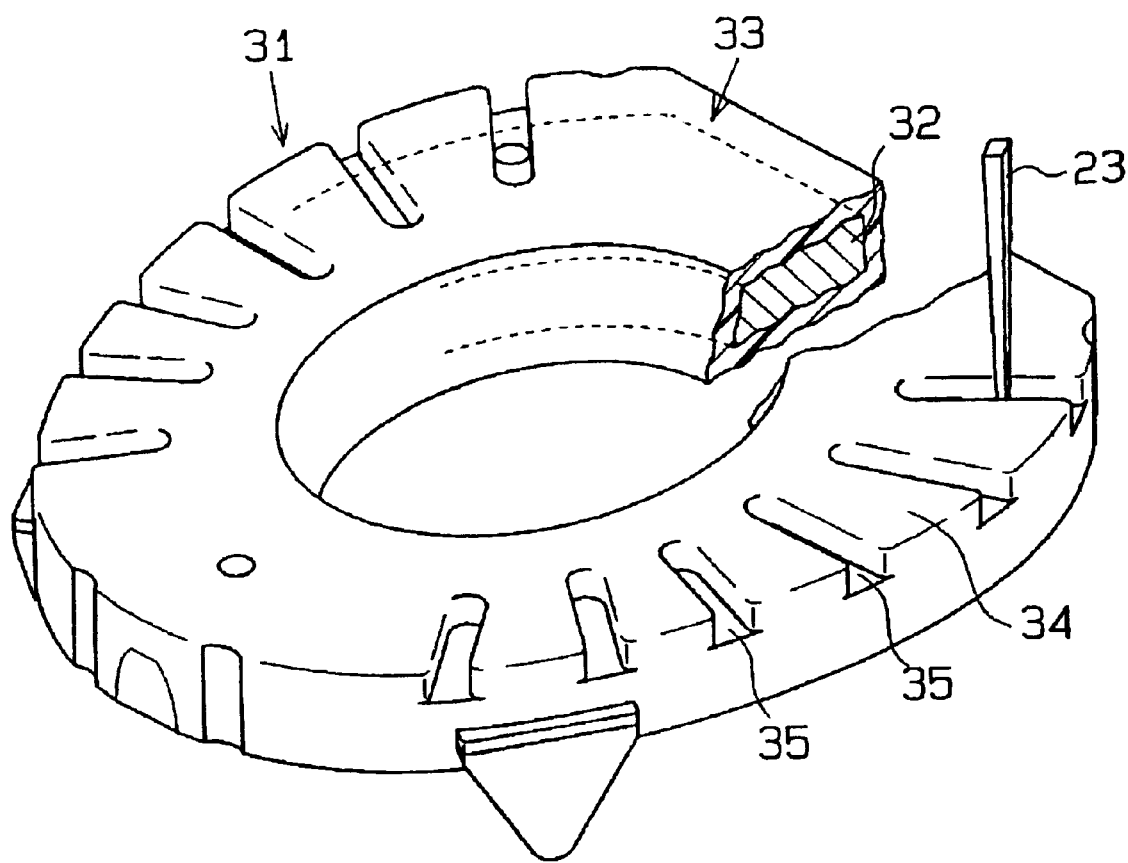
FIG. 9 is a perspective view illustrating a conventional horseshoe.

Marks 27 may substitute the recesses 25 as illustrated in FIG. 8. This allows the omission of the grooves 24, causing in simplification of manufacturing of the horseshoe.

What is claimed is:

1. A horseshoe to be mounted on a horse's hoof with nails, said horseshoe having an upper surface that contacts the hoof and a lower surface that contacts a surface of a road, said horseshoe comprising:

a plurality of indexing groups for specifying locations where the nails are to be driven, each of the indexing groups extending in the lower surface of the horseshoe substantially parallel to each other in a lateral direction substantially perpendicular to a longitudinal direction of the horseshoe, wherein each of the indexing groups includes a plurality of grooves formed in said lower surface extending in a lateral direction substantially perpendicular to a longitudinal direction of the horseshoe, and wherein each of said grooves includes a plurality of notches arranged along inner walls of the grooves.

2. The horseshoe as set forth in claim 1, wherein the inner walls define the notches, and said nails have a side abutting the inner walls, whereby the nails are kept untilted.

3. A horseshoe to be mounted on a horse's hoof with nails, said horseshoe having an upper surface that contacts the hoof and a lower surface that contacts a surface of a road, said horseshoe comprising:

a plurality of indexing recesses for specifying locations where the nails are to be driven, said indexing recesses being arranged in said lower surface consecutively in a predetermined pitch in a lateral direction substantially perpendicular to a longitudinal direction of the horseshoe;

a plurality of grooves formed in said lower surface extending in a lateral direction substantially perpendicular to a longitudinal direction of the horseshoe, wherein each of said grooves includes a bottom surface where said indexing recesses are located and a pair of inner walls opposing each other; and a plurality of guide notches formed on the inner walls of the grooves that keeps the nails from tilting when being driven, wherein said guide notches are arranged along the groove.

4. The horseshoe as set forth in claim 3, wherein each of said nails has a side abutting the inner walls, whereby the nails are kept from tilting.

* * * * *